No. 772,780. PATENTED OCT. 18, 1904.
E. BURHORN.
DEVICE FOR COOLING LIQUIDS.
APPLICATION FILED JULY 29, 1904.
NO MODEL.
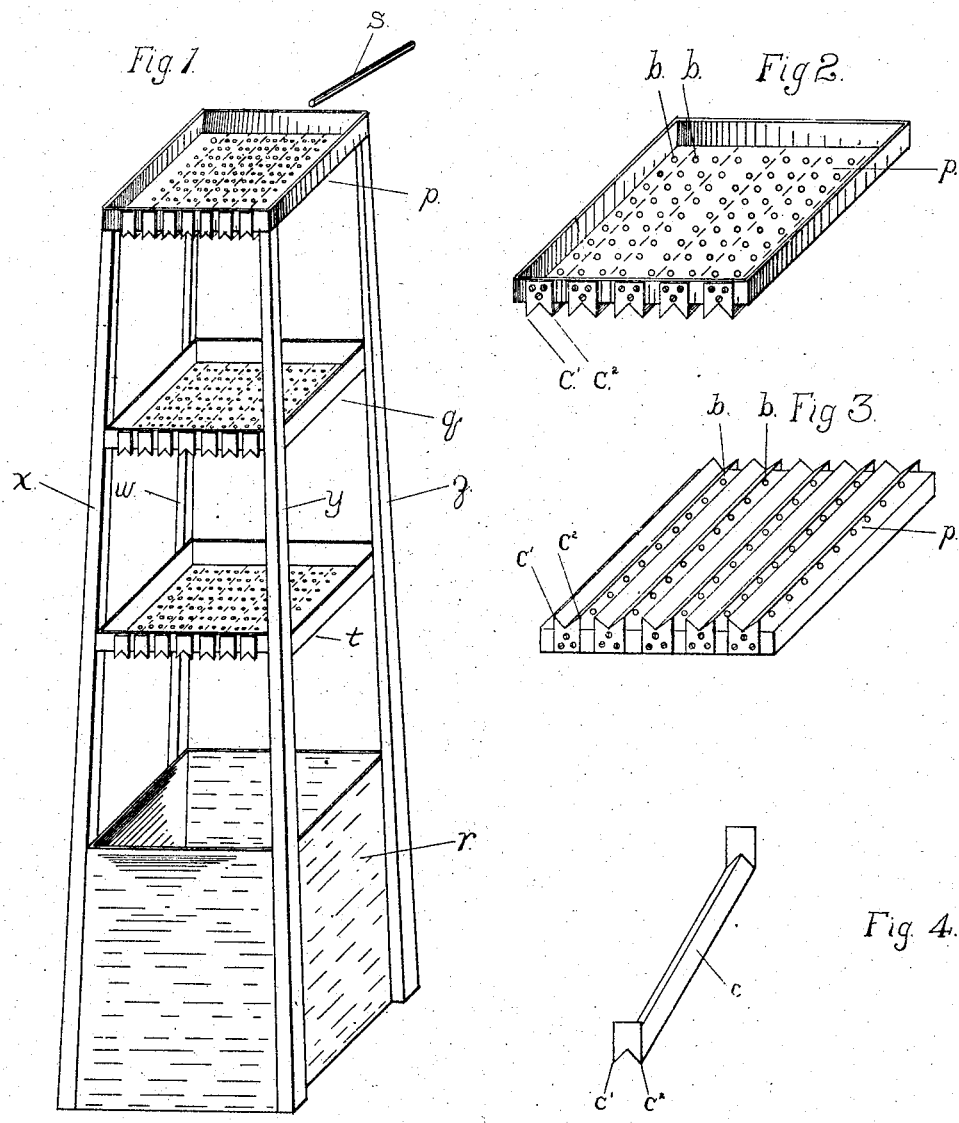
WITNESSES:
John J. McDonald
Justin P. Galland
INVENTOR
Edwin Burhorn
BY
Andrew Fould Jr.
his ATTORNEY No. 772,780. Patented October 18, 1904.

UNITED STATES PATENT OFFICE.

EDWIN BURHORN, OF HOBOKEN, NEW JERSEY.

DEVICE FOR COOLING LIQUIDS.

SPECIFICATION forming part of Letters Patent No. 772,780, dated October 18, 1904.

Application filed July 29, 1904. Serial No. 218,600. (No model.)

*To all whom it may concern:*

Be it known that I, EDWIN BURHORN, a citizen of the United States, residing at Hoboken, in the county of Hudson and State of New Jersey, have invented certain new and useful Improvements in Devices for Cooling Liquids, of which the following is a specification.

My invention relates to improvements in devices for cooling liquids in which the liquid to be cooled is separated into small drops which are brought into contact with the air; and the object of my device is to provide an effective means for cooling liquids by natural aeration and evaporation. I attain this object by the device illustrated in the accompanying drawings, in which—

Figure 1 is a perspective view of my device. Fig. 2 is a view of the pan. Fig. 3 is a view of the pan inverted. Fig. 4 is a view of the spraying device.

Similar letters refer to similar parts throughout the several views.

To a framework consisting of four uprights $w$, $x$, $y$, and $z$ I secure a series of pans $p$ $q$ $t$ above a reservoir $r$. The pans, which I prefer to form of sheet metal, are secured at their corners to the uprights $w$, $x$, $y$, and $z$ by rivets or in any other suitable manner and are provided with perforations $b$ $b$ through their bottoms to allow the liquid to drip through. These perforations $b$ $b$ are placed in pairs in parallel lines across the pans, and below the bottom of each pan between each pair of parallel lines of perforations is provided a spraying device $c$, consisting of a strip of angle-iron or other metal having two leaves $c'$ $c^2$. I secure the angle-pieces $c$ $c$ to the pans by bending up the flattened-out ends of the angle-pieces $c$ $c$ and riveting these bent-up ends to the sides of the pan, allowing the bottom of the pan to rest upon the angle-piece, as I find that the pans are thus strengthened and made more rigid. The edge of the angle-iron rests between the parallel lines of the perforations $b$ $b$, so that the liquid dropping through the perforations $b$ $b$ will fall upon the leaves $c'$ and $c^2$, respectively, and will drip in the form of small drops or spray to the pan below. I do not, however, desire to limit myself to the particular means shown for attaching the angle-pieces $c$ $c$ to pans, as any other desired means may be used. I have shown in my drawings two pans $p$, $q$, and $t$; but any number of pans may be used.

The operation of my device is as follows: The liquid to be cooled is discharged into the upper pan by means of a pipe $s$ or in any other suitable manner. It will then drip through the perforations $b$ $b$ onto the leaves $c'$ or $c^2$, respectively, secured below the pan and from these leaves will drip into the pan below and will pass through the successive pans of the series to the reservoir $r$.

Having thus described my invention, what I desire to secure by Letters Patent of the United States is—

1. In a device of the character described, the combination of a framework having a series of pans secured thereto, each provided with a series of perforations in its bottom, and a series of angle-pieces provided with bent-up ends secured to the sides of the pan substantially as shown and described.

2. In a device of the character described a pan provided with perforations in its bottom and an angle-piece having two leaves below the pan each projecting at an angle to the bottom of the pan below the perforations in its bottom, substantially as shown and described.

In testimony whereof I affix my signature in presence of two witnesses.

EDWIN BURHORN.

Witnesses:
ADOLPH F. SCHMIDT,
WM W. KEEN.